(12) United States Patent
Fukuda et al.

(10) Patent No.: US 6,485,855 B1
(45) Date of Patent: Nov. 26, 2002

(54) ACTIVE SOLID POLYMER ELECTROLYTE MEMBRANE IN SOLID POLYMER TYPE FUEL CELL AND PROCESS FOR THE PRODUCTION THEREOF

(75) Inventors: Kaoru Fukuda, Wako (JP); Kazuhide Terada, Wako (JP); Nobuhiro Saito, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 101 days.

(21) Appl. No.: 09/598,266

(22) Filed: Jun. 21, 2000

(30) Foreign Application Priority Data

Jun. 21, 1999 (JP) .......................................... 11-174640
Jun. 21, 1999 (JP) .......................................... 11-174641

(51) Int. Cl.[7] ................................................ H01M 8/10
(52) U.S. Cl. .......................... 429/30; 429/40; 429/41; 429/42; 429/43; 429/44; 429/12; 29/623.5
(58) Field of Search .............................. 429/30, 40–45, 429/12; 29/623.5

(56) References Cited

U.S. PATENT DOCUMENTS

| | | | | |
|---|---|---|---|---|
| 5,399,184 A | * | 3/1995 | Harada | 29/623.4 |
| 5,958,616 A | * | 9/1999 | Salinas et al. | 429/41 |
| 6,020,083 A | * | 1/2000 | Breault et al. | 429/36 |
| 6,297,564 B1 | * | 10/2001 | Chung | 257/783 |

* cited by examiner

Primary Examiner—Patrick Ryan
Assistant Examiner—Angela J Martin
(74) Attorney, Agent, or Firm—Arent Fox Kintner Plotkin & Kahn

(57) ABSTRACT

An active solid polymer electrolyte membrane in a solid polymer type fuel cell comprises a solid polymer electrolyte membrane and a plurality of precious metal catalyst particles supported on the surfaces of the aforementioned solid polymer electrolyte membrane by ion exchange and distributed uniformly over the surfaces thereof. In accordance with the use of this active solid polymer electrolyte membrane the ability to generate power can be enhanced.

14 Claims, 10 Drawing Sheets

ACTIVE SOLID POLYMER ELECTROLYTE MEMBRANE IN SOLID POLYMER TYPE FUEL CELL AND PROCESS FOR THE PRODUCTION THEREOF

BACKGROUND OF THE INVENTION

1. Field of the Invention

The present invention relates to active solid polymer electrolyte membranes in solid polymer type fuel cells and a process for the production thereof.

2. Description of the Prior Art

With regard to active solid polymer electrolyte membranes of this type in the art, those in which a precious metal catalyst is supported on the surface of a solid polymer electrolyte membrane by a sputtering method are known.

However, since the conventional precious metal catalyst is formed as a layer, the conduction of the generated hydrogen ions to the solid polymer electrolyte membrane and the conduction from the electrolyte membrane to the air electrode are comparatively low, and the area of the interface at which the three elements of precious metal catalyst, solid polymer electrolyte membrane and fuel gas (hydrogen and air) come into contact with each other, that is to say, the area of the three phase interface, is small and in spite of a large amount of precious metal being supported on the electrolyte membrane the ability of the fuel cell to generate power is low, which is a problem.

SUMMARY OF THE INVENTION

It is an object of the present invention to provide an active solid polymer electrolyte membrane that can enhance the ability of the fuel cell to generate power with only a small amount of precious metal supported.

In accordance with the present invention in order to achieve the aforementioned object, an active solid polymer electrolyte membrane in a solid polymer type fuel cell comprises a solid polymer electrolyte membrane and a plurality of precious metal catalyst particles supported on the surfaces of the above-mentioned solid polymer electrolyte membrane by ion exchange and distributed uniformly over the surfaces thereof.

In accordance with the aforementioned arrangement, since the precious metal catalyst particles are present as spots on the surfaces of the aforementioned electrolyte membrane, the conduction of the generated hydrogen ions to the aforementioned electrolyte membrane and the conduction thereof from the electrolyte membrane to the air electrode both become high and association between the hydrogen ions and oxygen is enhanced. Moreover, the area of the three phase interface at which the three elements of precious metal catalyst particle, solid polymer electrolyte membrane and fuel gas come into contact with each other increases. Thus, it becomes possible to reduce the amount of precious metal supported on the aforementioned electrolyte membrane and at the same time increase the efficiency of power generation in the fuel cell.

Furthermore, in accordance with the present invention, an active solid polymer electrolyte membrane in a solid polymer type fuel cell is provided which comprises a solid polymer electrolyte membrane and a plurality of precious metal catalyst particles supported inside the surface layers of the above-mentioned solid polymer electrolyte membrane by ion exchange and distributed uniformly throughout the inside of the surface layers thereof.

In accordance with the aforementioned arrangement, since the precious metal catalyst particles are present as spots inside the surface layers of the aforementioned electrolyte membrane, the conduction of the generated hydrogen ions to the aforementioned electrolyte membrane and the conduction thereof from the electrolyte membrane to the air electrode become both high and association between the hydrogen ions and oxygen is enhanced. Moreover, the area of the three phase interface at which the three elements of precious metal catalyst particle, solid polymer electrolyte membrane and fuel gas come into contact with each other increases. It thus becomes possible to reduce the amount of precious metal supported in the aforementioned electrolyte membrane and at the same time increase the efficiency of power generation in the fuel cell.

Furthermore, it is an object of the present invention to provide a production process in which the aforementioned active solid polymer electrolyte membrane can be mass produced.

In accordance with the present invention in order to achieve the aforementioned object, there is proposed a process for the production of an active solid polymer electrolyte membrane in a solid polymer type fuel cell comprising a solid polymer electrolyte membrane and a plurality of precious metal catalyst particles supported on the surfaces of the above-mentioned solid polymer electrolyte membrane by ion exchange and distributed uniformly over the surfaces thereof, wherein the process comprises in sequence a step in which the aforementioned solid polymer electrolyte membrane is immersed in a solution of a precious metal complex so as to carry out ion exchange, a step in which the aforementioned solid polymer electrolyte membrane is washed with pure water, a step in which the aforementioned solid polymer electrolyte membrane is subjected to a reduction treatment, a step in which the aforementioned solid polymer electrolyte membrane is washed with pure water and a step in which the aforementioned solid polymer electrolyte membrane is dried.

The solid polymer electrolyte membranes which are known at present are polymer ion exchange membranes. Therefore, when the aforementioned ion exchange is carried out, precious metal complex ions are adsorbed on a plurality of ion exchange sites which are present on the surfaces of the aforementioned solid electrolyte membrane and are distributed uniformly over the surfaces thereof. In the first washing step, free precious metal complex ions which are present inside the aforementioned electrolyte membrane are removed and recovered. In the reduction step, groups of atoms bonded to the precious metal atoms of the precious metal complex ions are removed. In the second washing step the reducing component is removed from the aforementioned electrolyte membrane, and an active solid polymer electrolyte membrane can be obtained via the subsequent drying step.

When the reduction treatment is effected without carrying out the first washing, free precious metal atoms remain inside the aforementioned electrolyte membrane, and as these precious metal atoms generally do not contribute to the generation of hydrogen ions expensive precious metal is therefore wasted. When the second washing is not carried out, since residual reducing component interferes with the ionisation of hydrogen the ability to generate power is degraded.

In accordance with the present invention, there is further proposed a process for the production of an active solid polymer electrolyte membrane in a solid polymer type fuel cell comprising a solid polymer electrolyte membrane and a plurality of precious metal catalyst particles supported inside the surface layers of the above-mentioned solid polymer electrolyte membrane by ion exchange and distributed uniformly throughout the inside of the surface layers thereof, wherein the process comprises in sequence a step in which the aforementioned solid polymer electrolyte membrane is immersed in a liquid mixture of a solution of a precious metal complex and at least one additive chosen from the group comprising water-soluble organic solvents, nonionic surfactants and nonmetallic bases so as to carry out ion exchange, a step in which the aforementioned solid polymer electrolyte membrane is washed with pure water, a step in which the aforementioned solid polymer electrolyte membrane is subjected to a reduction treatment, a step in which the aforementioned solid polymer electrolyte membrane is washed with pure water and a step in which the aforementioned solid polymer electrolyte membrane is dried.

As hereinbefore described, when the ion exchange is carried out using a solid polymer electrolyte membrane, which is a polymer ion exchange membrane, under the influence of an additive as mentioned above, precious metal complex ions are adsorbed on a plurality of ion exchange sites which are present inside the surface layers of the aforementioned electrolyte membrane and are distributed uniformly throughout the inside the above-mentioned surface layer. In the first washing step, free precious metal complex ions and the additive which are present inside the aforementioned electrolyte membrane are removed and recovered. In the reduction step, groups of atoms bonded to the precious metal atoms of the precious metal complex ions are removed. In the second washing step the reducing component is removed from the aforementioned electrolyte membrane, and an active solid polymer electrolyte membrane can be obtained via the subsequent drying step.

When the reduction treatment is effected without carrying out the first washing, free precious metal atoms remain inside the aforementioned electrolyte membrane, and as these precious metal atoms generally do not contribute to the generation of hydrogen ions expensive precious metal is therefore wasted. When the second washing is not carried out, since residual reducing component interferes with the ionisation of hydrogen the ability to generate power is degraded.

The above-mentioned objects, other objects, characteristics and advantages of the present invention will be clarified by an explanation of preferable embodiments which are described in detail below by reference to the attached drawings.

DESCRIPTION OF PREFERABLE EMBODIMENTS

Embodiment

Figure 1:
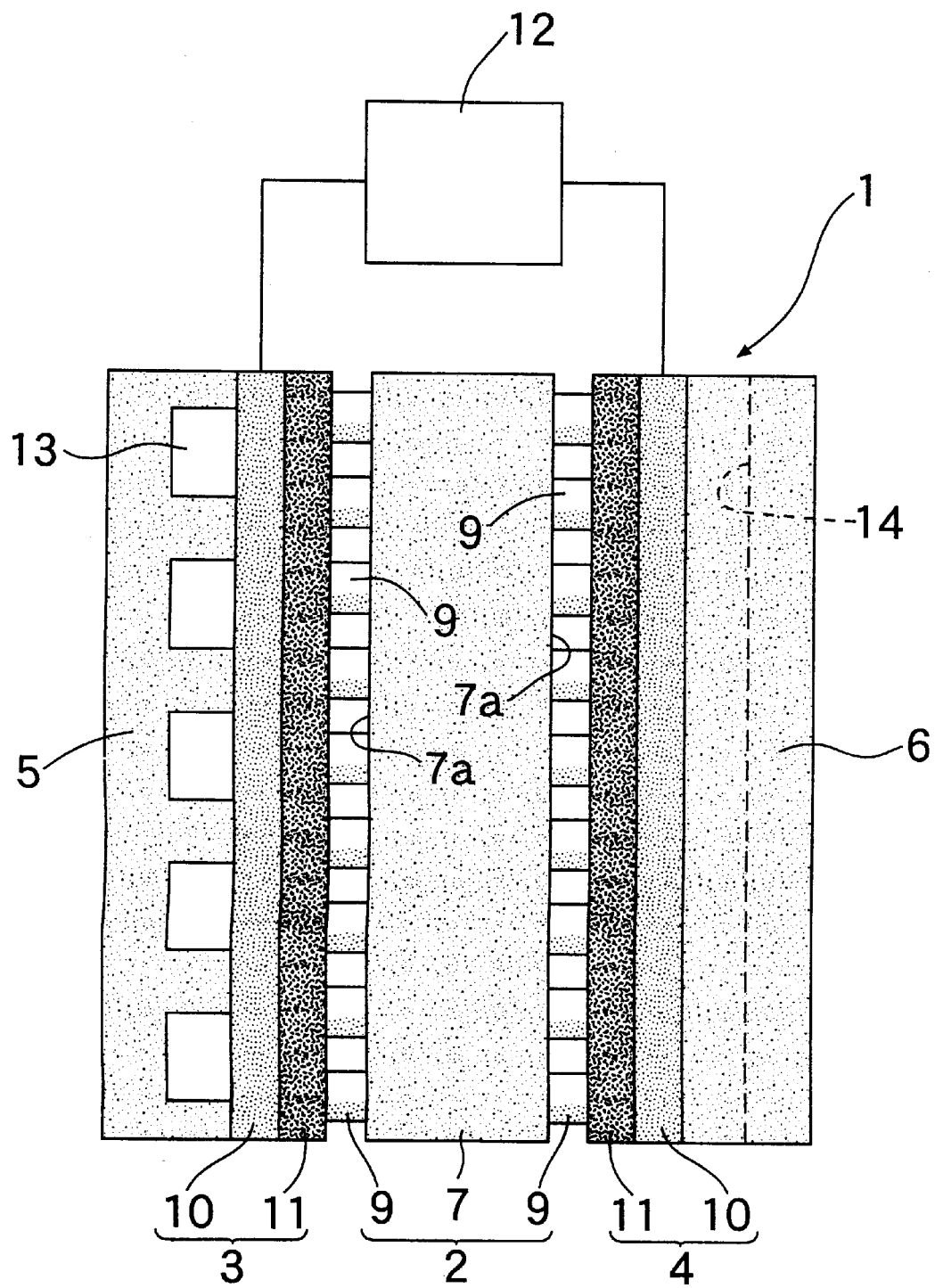
FIG. 1 is a schematic side view showing one example of a cell unit forming a solid polymer type fuel cell.

In FIG. 1 a cell unit 1 forming a solid polymer type fuel cell comprises an active solid polymer electrolyte membrane 2 (hereinafter in this section termed an active electrolyte membrane), an air electrode 3 and a fuel electrode 4, each of which are in close contact with the corresponding sides of the above-mentioned active electrolyte membrane, and a pair of separators 5, 6 which are in close contact with the two electrodes 3, 4 respectively.

Figure 2:
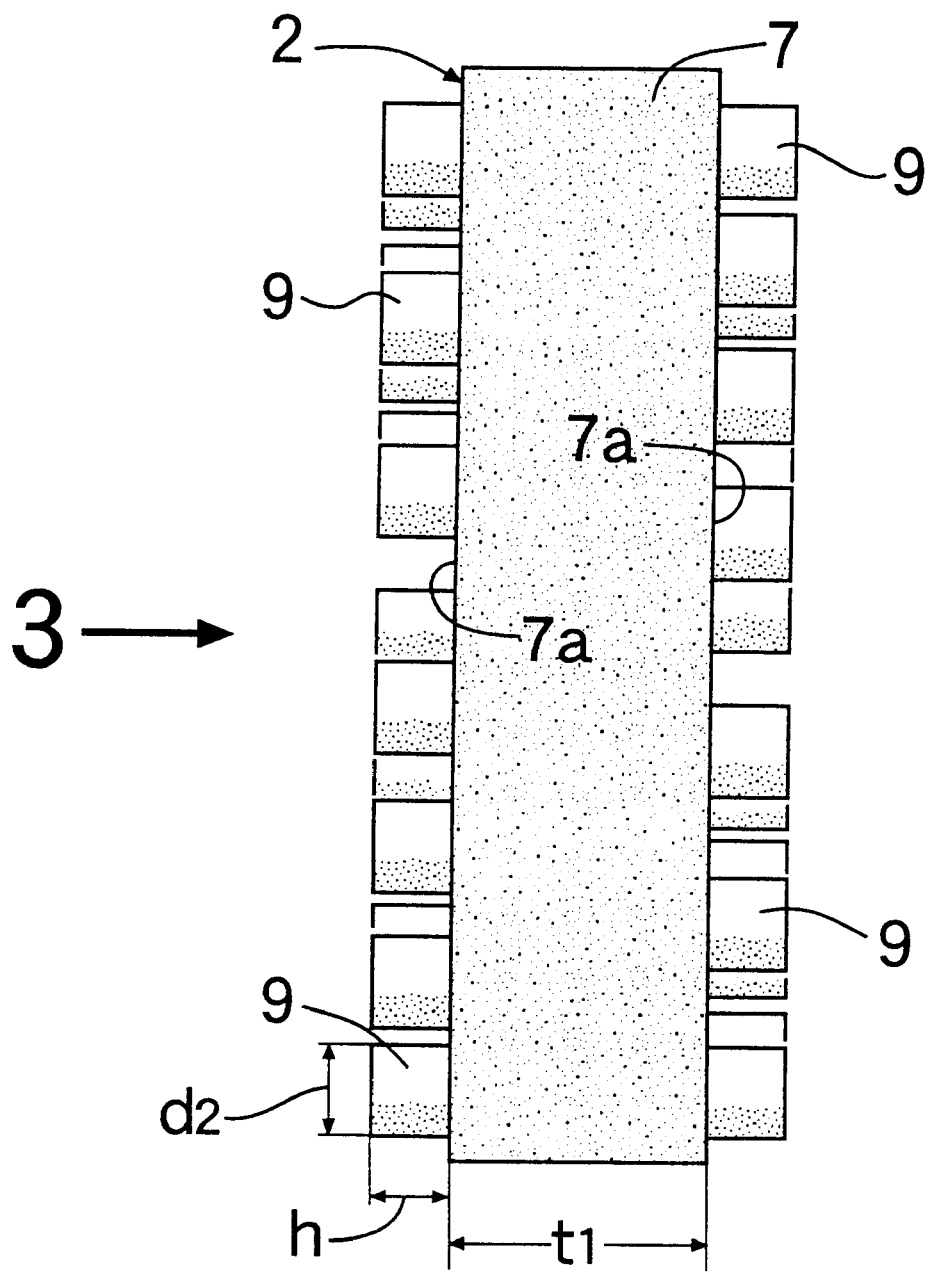
FIG. 2 is a schematic side view of an active solid polymer electrolyte membrane.
Figure 3:
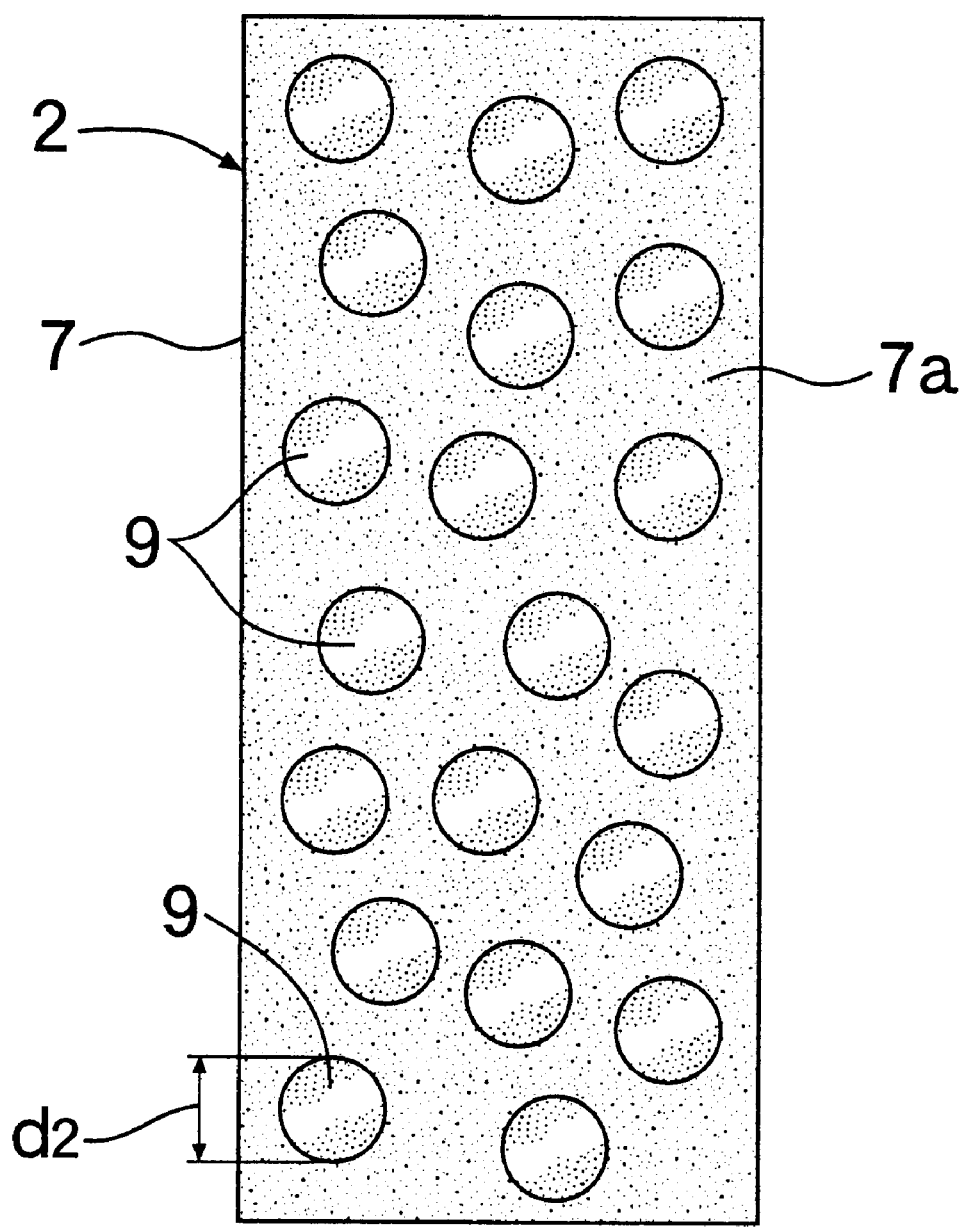
FIG. 3 is a view taken in the direction of an arrow 3 in FIG. 2.

As shown in FIGS. 2 and 3, the active electrolyte membrane 2 comprises a solid polymer electrolyte membrane 7 (hereinafter in this section termed an electrolyte membrane) having a thickness $t_1$ which satisfies the relationship 5 $\mu m \leq t_1 \leq 200$ $\mu m$, and a plurality of precious metal catalyst particles 9 which are supported on the surfaces 7a (mainly the two plane surfaces) of the aforementioned electrolyte membrane 7 by ion exchange and distributed uniformly over the surfaces 7a thereof. Each of the precious metal catalyst particles 9 is a secondary particle having a columnar shape which is formed by aggregation of primary particles having a crystallite diameter $d_1$ by X-ray diffraction of $\leq 6$ nm. The particle size $d_2$ of the precious metal catalyst particles 9 is $\leq 300$ nm and the height h is $\leq 200$ nm.

The percentage coverage z of the surfaces 7a of the electrolyte membrane 7 by the precious metal catalyst particles 9 which are present on the surfaces 7a is set so as to be <95%. In the case where z $\geq 95$%, the conduction, etc. of hydrogen ions to the electrolyte membrane 7 is degraded.

The aforementioned percentage coverage z is determined by the following method. That is to say, five positions on one plane surface of the surfaces 7a of the electrolyte membrane 7 in the embodiments were scanned by a scanning electron microscope (SEM) at a magnification of 10,000 to 50,000 times, sections corresponding to the precious metal catalyst particles were then differentiated from sections corresponding to the plane surface by image analysis of each of the SEM images, the total area of the sections corresponding to precious metal catalyst particles 9 was defined as X and the area of the sections corresponding to the plane surface was defined as y (including x), $z_1=(x/y)\times 100$ (%) was calculated, and an average value z was then calculated for all the scanned positions.

With regard to the electrolyte membrane 7, fluorinated resin type ion exchange membranes such as, for example, Flemion (brand name, made by Asahi Glass Co., Ltd.) and Nafion (brand name, made by Du Pont) can be used. With regard to the precious metal catalyst particles 9, for example, Pt particles can be cited.

The air electrode 3 and the fuel electrode 4 both comprise a porous carbon sheet 10 and an auxiliary catalyst layer 11 which is coated on one surface of the porous carbon sheet 10, and the auxiliary catalyst layer 11 faces the surface 7a of the electrolyte membrane 7 and is in close contact with each of the precious metal catalyst particles 9. Each of the auxiliary catalyst layers 11 comprises carbon black particles on the surface of which Pt particles are supported and a fluorinated resin type ion exchanger (brand name, Flemion), which is a polymer electrolyte. The porous carbon sheets 10 of the opposite electrodes 3, 4 are connected to a load 12, for example, a direct current electromotor device for a vehicle.

Each of the separators 5, 6 is formed from graphite so as to have an identical shape, air is supplied to a plurality of channels 13 provided in the separator 5 on the side of the air electrode 3 and hydrogen is supplied to a plurality of channels 14 provided in the separator 6 on the side of the fuel electrode 4 and arranged so that they run across the direction of the aforementioned channels 13.

When producing the aforementioned active electrolyte membrane 2, a step in which ion exchange is carried out by immersing the electrolyte membrane 7 in a solution of a Pt complex, a step in which the electrolyte membrane 7 is washed with pure water, a step in which the electrolyte membrane 7 is subjected to a reduction treatment, a step in which the electrolyte membrane 7 is washed with pure water and a step in which the electrolyte membrane 7 is dried are carried out in that order.

When carrying out the aforementioned ion exchange, Pt complex ions are adsorbed on a plurality of ion exchange sites which are present on the surfaces 7a of the electrolyte membrane 7. In the first washing step, free Pt complex ions present inside the electrolyte membrane 7 are removed and recovered. In the reduction step, the atomic groups bonded to the Pt atoms of the Pt complex ions are removed. In the second washing step, the reducing component is removed from the electrolyte membrane 7 and an active electrolyte membrane 2 can be obtained via the subsequent drying step.

When the reduction treatment is effected without carrying out the first washing, free Pt atoms remain inside the aforementioned electrolyte membrane 7, these Pt atoms generally do not contribute to the generation of hydrogen ions, and expensive Pt atoms is therefore wasted. When the second washing is not carried out, since residual reducing component interferes with the ionisation of hydrogen the ability to generate power is degraded.

Detailed embodiments are described below.

The active electrolyte membrane 2 of Embodiment 1 was obtained via the following steps.

(a) A cationic Pt complex solution was prepared containing Pt in the form of $[Pt(NH_3)_4]^{2+}$ at 1.5 times the target amount (0.15 mg/cm$^2$) of Pt that was to be supported.

(b) In order to carry out ion exchange, an electrolyte membrane (brand name, Flemion) 7 having both a length and a width of 70 mm was immersed in the Pt complex solution, and the solution was then heated to 60° C. and stirred at that temperature for 12 hours.

(c) In order to carry out washing, the electrolyte membrane 7 was immersed in pure water, and the pure water was then heated to 50° C. and stirred at that temperature for 2 hours.

(d) In order to carry out the reduction treatment, the wash was discarded from the container in which the electrolyte membrane had been placed, new pure water was added to the container and the electrolyte membrane 7 was immersed in the pure water. A reducing liquid mixture having a molar concentration of 10 times the number of moles of the target amount of Pt supported, that is to say, a liquid mixture containing sodium borohydride and sodium carbonate was prepared. The pure water in which the electrolyte membrane 7 was immersed was heated to 50° C. and the entire amount of the reducing liquid mixture was added dropwise to the pure water at the above-mentioned temperature over 30 minutes. Subsequently, the mixture was allowed to stand for about 1.5 hours, and when no more gas (mainly hydrogen) was generated from the solution the reaction was assumed to be complete.

(e) In order to carry out washing so as to remove the Na component, the electrolyte membrane 7 was immersed in pure water, and the pure water was then heated to 50° C. and stirred at that temperature for 2 hours.

(f The electrolyte membrane 7 was dried by keeping it in a dryer at 60° C. for 4 hours.

The active electrolyte membrane 2 of Embodiment 2 was obtained under the same conditions as those used in Embodiment 1 except that the amount of solvent used in the aforementioned cationic Pt complex solution was reduced to two thirds of the amount used in Embodiment 1.

The active electrolyte membrane 2 of Embodiment 3 was obtained under the same conditions as those used in Embodiment 1 except that the aforementioned cationic Pt complex solution used contained Pt at 3 times the target amount of Pt that was to be supported (0.15 mg/cm$^2$).

The active electrolyte membrane 2 of Embodiment 4 was obtained under the same conditions as those used in Embodiment 1 except that the aforementioned cationic Pt complex solution used contained Pt at 0.5 times the target amount of Pt that was to be supported (0.15 mg/cm$^2$).

The active electrolyte membrane 2 of Embodiment 5 was obtained under the same conditions as those used in Embodiment 1 except that the aforementioned cationic Pt complex solution used contained Pt at 0.1 times the target amount of Pt that was to be supported (0.15 mg/cm$^2$).

The active electrolyte membrane 2 of Comparative Embodiment 1 was obtained under the same conditions as those used in Embodiment 1 except that the aforementioned cationic Pt complex solution used contained Pt at 10 times the target amount of Pt that was to be supported (0.15 mg/cm$^2$).

A Pt catalyst layer was formed by a sputtering method on the surfaces of an electrolyte membrane 7 (brand name, Flemion) which was of the same type as that used in Embodiment 1. This active electrolyte membrane 2 was termed Comparative Embodiment 2.

An air electrode 3 and a fuel electrode 4 were prepared by a method involving the formation of an auxiliary catalyst layer 11 by coating a mixture of carbon black particles, on the surface of which Pt particles had been supported, and a fluorinated resin type ion exchanger (brand name, Flemion), which is a polymer electrolyte, on one surface of a porous carbon sheet 10. In this case, the ratio by weight of the carbon black particles to the Pt particles was 1 to 1.

Table 1 shows the components in Examples 1 to 3 of the auxiliary catalyst layer 11. In the table, C denotes carbon black particles and PE denotes polymer electrolyte.

In Example 3, the layer comprised carbon black alone and was not an auxiliary catalyst layer 11, but it is listed for completeness, and PTFE (polytetrafluoroethylene) was used instead of a polymer electrolyte.

Table 2 shows the components of the active electrolyte membrane 2 and combinations with an auxiliary catalyst layer 11 in the fuel cell in Embodiments 1 to 6 and Comparative Embodiments 1 to 3.

The active electrolyte membrane 2 of Embodiment 6 was the same as that of Embodiment 1, the Pt catalyst in Comparative Embodiment 2 was in a layered form and the figure for its height h denotes the thickness of the layer. The electrolyte membrane 7 of Comparative Embodiment 3 was a membrane alone which had not been subjected to the aforementioned ion exchange treatment.

Each of the fuel cells was operated so as to examine the relationship between the current density and the terminal voltage, and the results are given in Table 3. In Table 3, Embodiments 1 to 6 and Comparative Embodiments 1 to 3 correspond to the fuel cells using the active electrolyte membranes 2, etc. of Embodiments 1 to 6 and Comparative Embodiments 1 to 3 in Table 2 respectively.

Figure 4:
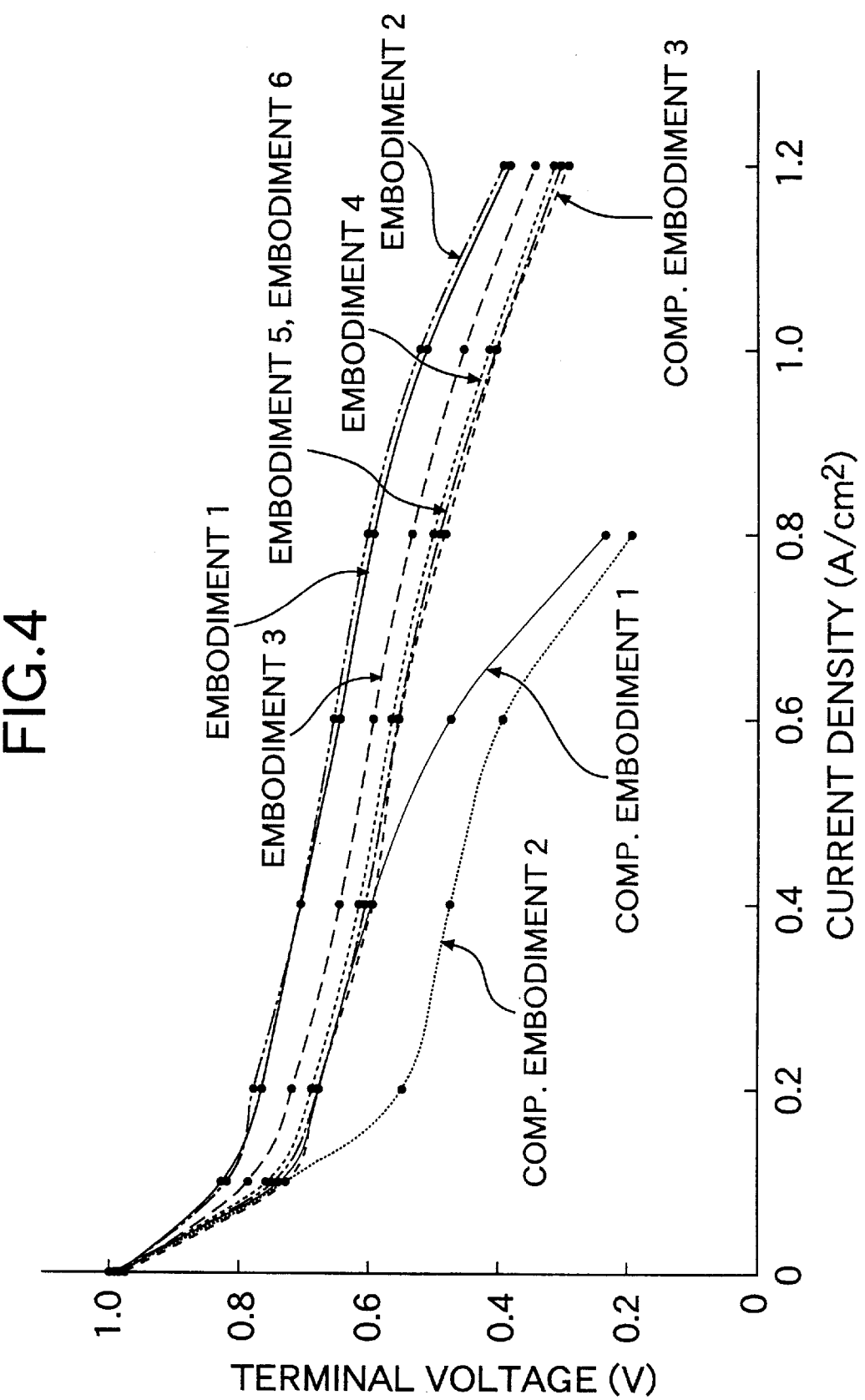
FIG. 4 is a graph showing the relationship between the current density and the terminal voltage in various types of solid polymer type fuel cell.

FIG. 4 is a graph showing the results given in Table 3. It can be seen from this figure that the fuel cells using Embodiments 1to 6 had a superior ability to generate power to those using Comparative Examples 1 and 2. Better results were obtained with Embodiments 1 and 2 than with Embodiment 3 in which the amount of Pt particles 9 supported was larger. This is mainly due to the difference in percentage coverage z and it is therefore preferable for the percentage coverage z to be $\leq 80\%$. It is also preferable for the amount CA of Pt particles 9 supported on the electrolyte membrane 7 to satisfy the relationship 0.05 mg/cm$^2 \leq$ CA $\leq 0.25$ mg/cm$^2$.

Comparative Embodiment 1 in which the amount of Pt particles supported was large but the percentage coverage z was 100% showed a similar trend to that shown in Comparative Embodiment 2 in which a sputtering method had been employed.

When comparing the fuel cell using Embodiment 6 which, although it had an active electrolyte membrane 2 did not have an auxiliary catalyst layer 11, with the fuel cell using Comparative Embodiment 3 which, although it had an auxiliary catalyst layer 11 did not have an active electrolyte membrane 2, even though the amount of Pt particles supported in Comparative Embodiment 3 was about 3 times that in Embodiment 6, the ability to generate power of the two fuel cells was almost the same. This result suggests that the significance of supporting Pt particles 9 directly on the surfaces 7a of the electrolyte membrane 7 is clear.

Moreover, although the amount of Pt particles 9 supported in Comparative Embodiments 4 and 5 was about 0.3 and 0.1 times that in Embodiment 6 respectively, the ability of the fuel cells using them to generate power was approximately the same as that of the fuel cell using Embodiment 6, which is due to the assistance by the auxiliary catalyst support 11.

Figure 5:
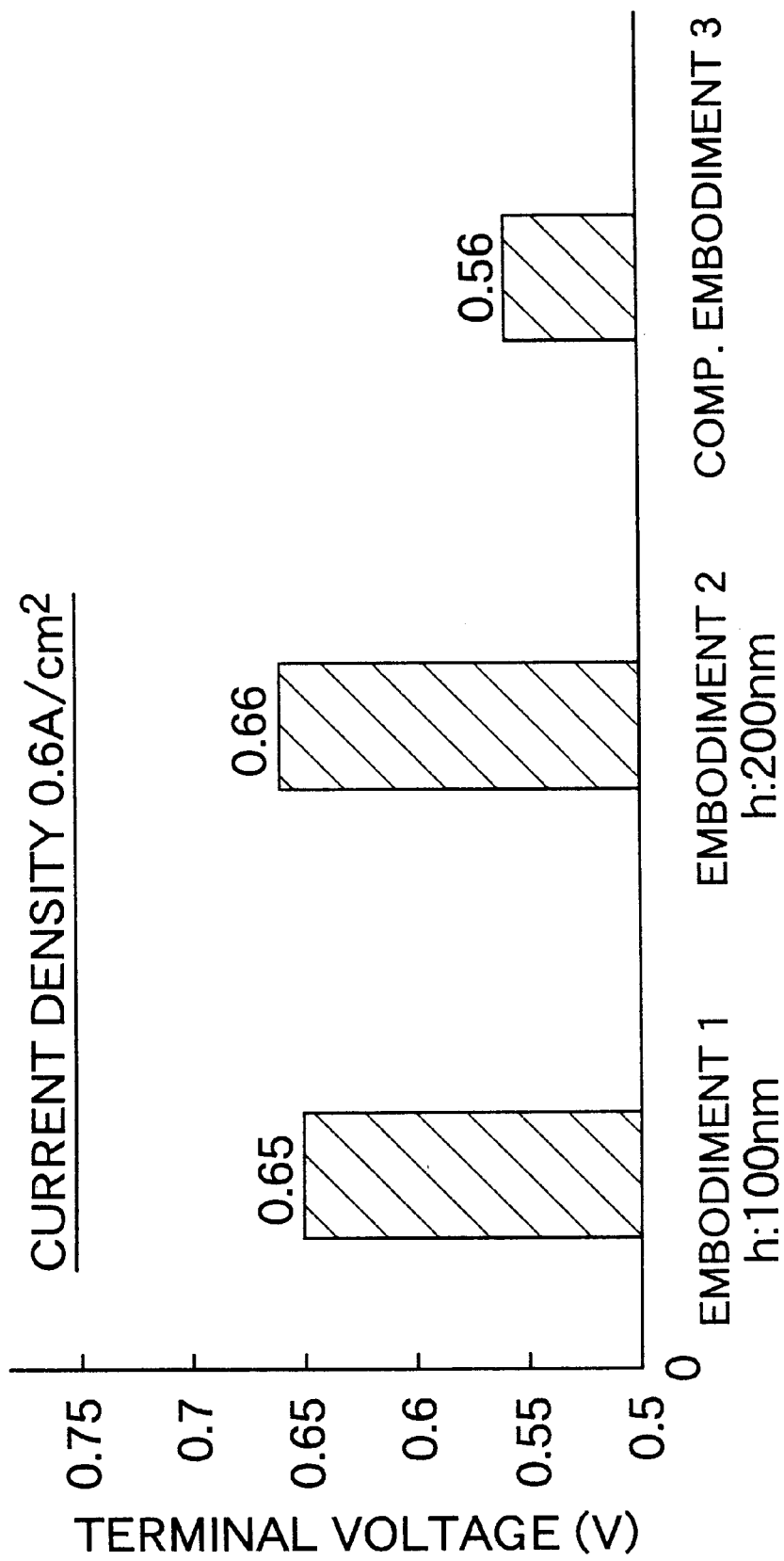
FIG. 5 is a graph showing the terminal voltages at a current density of 0.6 A/cm$^2$ in the solid polymer type fuel cells of Embodiments 1 and 2 and Comparative Embodiment 3.

FIG. 5 shows a comparison of the terminal voltages when the current density was 0.6 A/cm$^2$ in the three types of fuel cell using Embodiments 1 and 2 and Comparative Embodiment 3. The significance of supporting Pt particles 9 directly on the surfaces 7a of the electrolyte membrane 7 can also be seen from this figure.

Embodiment II

Figure 6:
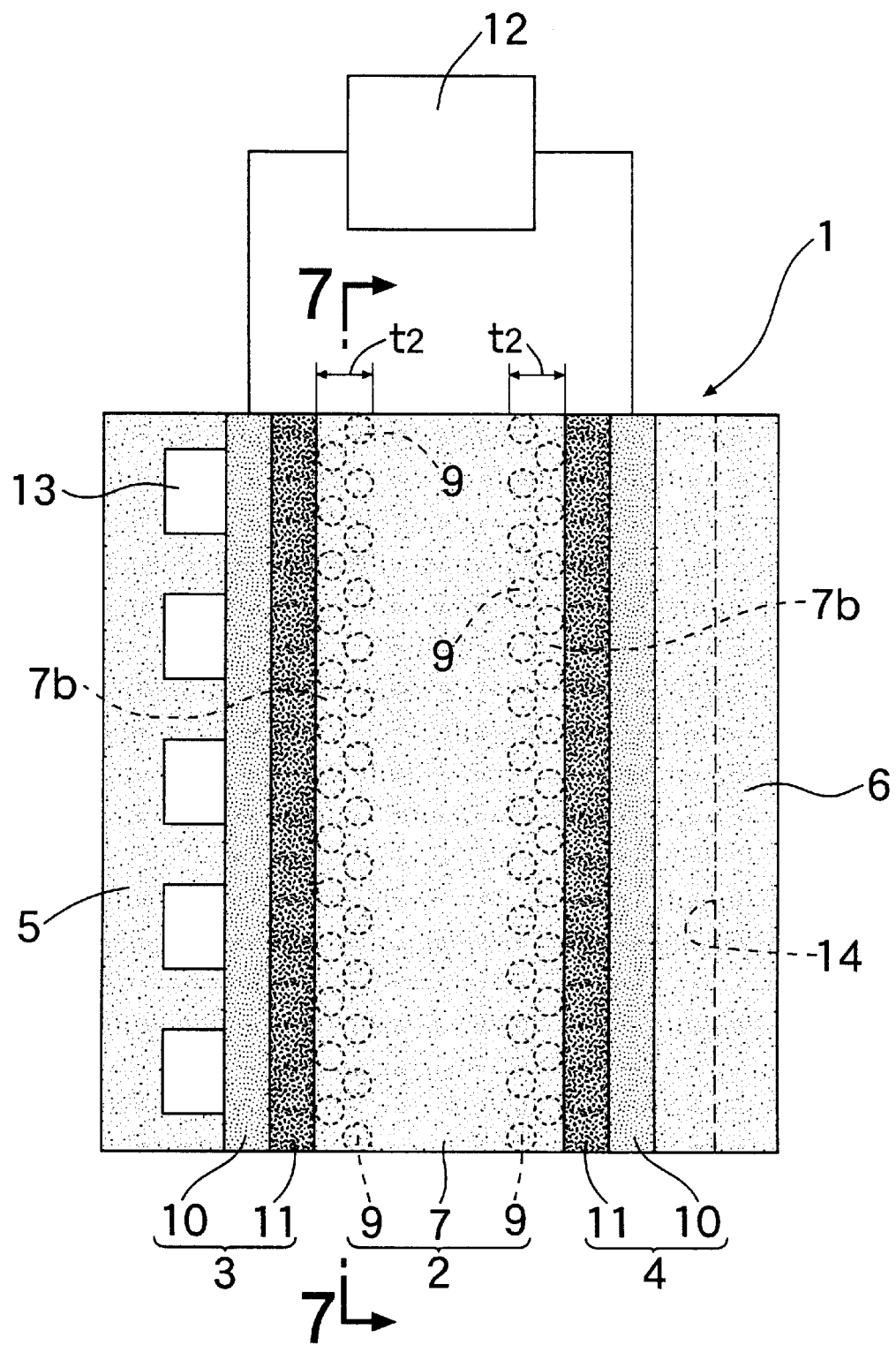
FIG. 6 is a side view showing another example of a cell unit forming a solid polymer type fuel cell.
Figure 7:
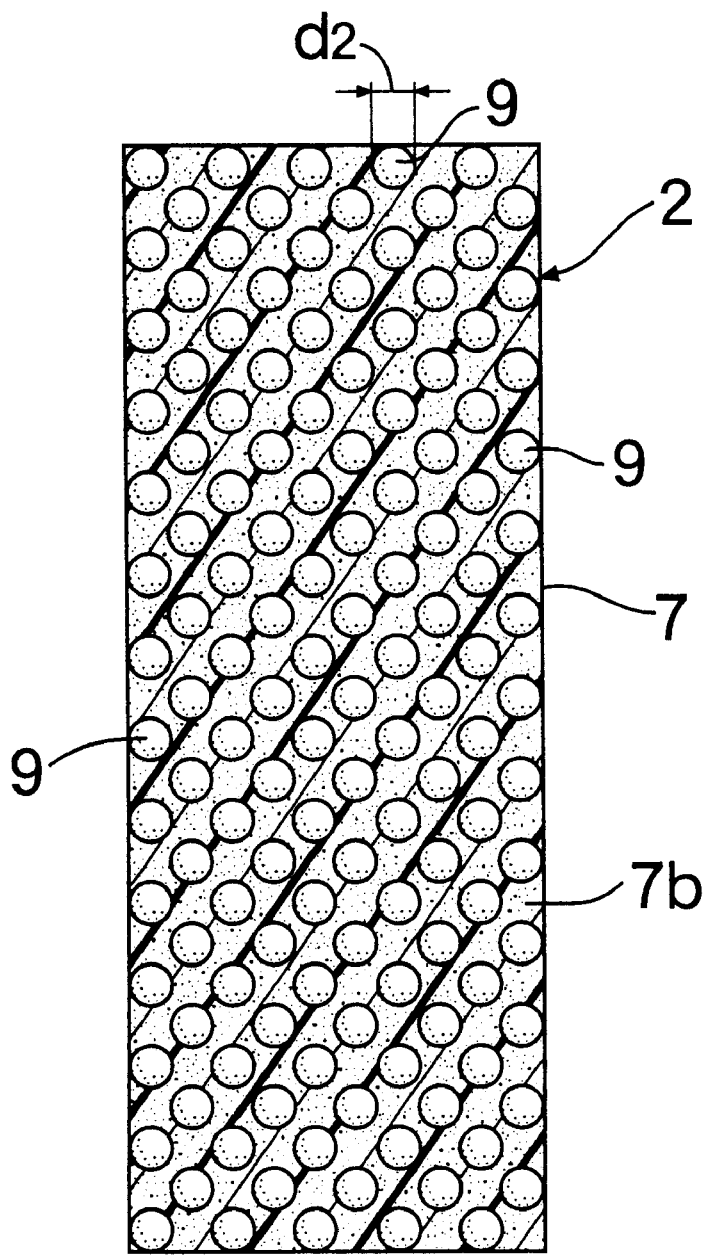
FIG. 7 is a schematic cross-sectional view of an active solid polymer electrolyte membrane corresponding to a cross-sectional view taken along a line 7—7 in FIG. 6.

In FIGS. 6 and 7 a cell unit 1 forming a solid polymer type fuel cell comprises an active solid polymer electrolyte membrane 2 (hereinafter in this section termed an active electrolyte membrane), an air electrode 3 and a fuel electrode 4, each of which are in close contact with the surfaces on both the sides of the above-mentioned active electrolyte membrane, and a pair of separators 5, 6 which are in close contact with the above-mentioned two electrodes 3, 4 respectively.

The active electrolyte membrane 2 comprises a solid polymer electrolyte membrane 7 (hereinafter in this section termed an electrolyte membrane) having a thickness to which satisfies the relationship 5 $\mu$m $\leq t_1 \leq$ 200 $\mu$m, and a plurality of precious metal catalyst particles 9 which are supported inside the surface layers 7b of the aforementioned electrolyte membrane 7 by ion exchange and distributed uniformly throughout the inside of the surface layer 7b thereof. The thickness $t_2$ of the surface layers 7b is $\leq$10 $\mu$m. Each of the precious metal catalyst particles 9 is a secondary particle, which is formed by aggregation of primary particles having a crystallite diameter $d_1$ by X-ray diffraction of $\leq$5 nm, and their particle size $d_2$ satisfies the relationship 10 nm $\leq d_2 \leq$ 200 nm.

With regard to the electrolyte membrane 7, fluorinated resin type ion exchange membranes such as, for example, Flemion (brand name, made by Asahi Glass Co., Ltd.) and Nafion (brand name, made by Du Pont) can be used. With regard to the precious metal catalyst particles 9, for example, Pt particles can be cited.

The air electrode 3 and the fuel electrode 4 both comprise a porous carbon sheet 10 and an auxiliary catalyst layer 11 which is coated on one surface of the porous carbon sheet 10, and the auxiliary catalyst layers 11 are in close contact with the surfaces on both sides of the electrolyte membrane 7. Each of the auxiliary catalyst layers 11 comprises carbon black particles on the surface of which Pt particles are supported and a fluorinated resin type ion exchanger (brand name, Flemion), which is a polymer electrolyte. The porous carbon sheets 10 of the two electrodes 3, 4 are connected to a load 12, for example, a direct current electromotor device for a vehicle.

Each of the separators 5, 6 is formed from graphite so as to have an identical shape, air is supplied to a plurality of channels 13 provided in the separator 5 on the side of the air electrode 3 and hydrogen is supplied to a plurality of channels 14 provided in the separator 6 on the fuel electrode 4 side and arranged so that they run across the direction of the aforementioned channels 13.

When producing the aforementioned active electrolyte membrane 2, a step in which ion exchange is carried out by immersing the electrolyte membrane 7 in a liquid mixture of a precious metal complex solution and at least one type of additive chosen from the group comprising water-soluble organic solvents, nonionic surfactants and nonmetallic bases, a step in which the electrolyte membrane 7 is washed with pure water, a step in which the electrolyte membrane 7 is subjected to a reduction treatment, a step in which the electrolyte membrane 7 is washed with pure water and a step in which the electrolyte membrane 7 is dried are carried out in that order.

With regard to the precious metal complex solution, for example, a cationic Pt complex solution containing [Pt(NH$_3$)$_4$]$^{2+}$, which is a Pt complexion, is used. With regard to the additives, methanol, ethanol, ethylene glycol, etc. can be used as the water-soluble organic solvents, polyoxyethylene dodecyl ether (e.g., product name Briji 35), polyoxyethylene octylphenyl ether, etc. are used as the nonionic surfactants, and ammonia, etc. is used as the nonmetallic base.

When the ion exchange is carried out under the influence of the aforementioned additives, the Pt complex ions are adsorbed on a plurality of ion exchange sites which are present inside the surface layer 7b of the electrolyte membrane 7 and distributed uniformly throughout the inside of the above surface layer 7b. In the first washing step, free Pt complex ions and the additive present inside the electrolyte membrane 7 are removed and recovered. In the reduction step, the atomic groups bonded to the Pt atoms of the Pt complex ions are removed. In the second washing step, the reducing component is removed from the electrolyte membrane 7 and an active electrolyte membrane 2 can be obtained via the subsequent drying step.

When the reduction treatment is effected without carrying out the first washing step, free Pt atoms remain inside the electrolyte membrane 7 which generally do not contribute to the generation of hydrogen ions, and expensive Pt is therefore wasted. When the second washing is not carried out, since residual reducing component interferes with the ionisation of hydrogen the ability to generate power is degraded.

Detailed embodiments are described below.

The active electrolyte membrane 2 of Embodiment 7 was obtained via the following steps.

(a) A liquid mixture was prepared by adding 100 cc of 25% aqueous ammonia (additive) to a cationic Pt complex solution containing Pt at 3 times the target amount (0.15 mg/cm$^2$) of Pt that was to be supported.

(b) In order to carry out ion exchange, an electrolyte membrane (brand name Flemion) 7 having both a length and a width of 70 mm was immersed in the liquid mixture, and the above-mentioned liquid mixture was then heated to 60° C. and stirred at that temperature for 12 hours.

(c) In order to carry out washing, the electrolyte membrane 7 was immersed in pure water, and the pure water was then heated to 50° C. and stirred at that temperature for 2 hours.

(d) In order to carry out the reduction treatment, the aforementioned wash was discarded from the container in which the electrolyte membrane had been placed, new pure water was added to the container and the electrolyte membrane 7 was immersed in the pure water. A reducing liquid mixture having a molar concentration of 10 times the number of moles of the target amount of Pt that was to be supported, that is to say, a liquid mixture containing sodium borohydride and sodium carbonate was prepared. The pure water in which the electrolyte membrane 7 was immersed was heated to 50° C. and the entire amount of the aforementioned reducing liquid mixture was added dropwise to the pure water at the above-mentioned temperature over 30 minutes. Subsequently, the mixture was allowed to stand for about 1.5 hours, and when no more gas (mainly hydrogen) was generated from the mixture the reaction was assumed to be complete.

(e) In order to carry out washing so as to remove the Na component, the electrolyte membrane 7 was immersed in pure water, and the pure water was then heated to 50° C. and stirred at that temperature for 2 hours.

(f) The electrolyte membrane 7 was dried by keeping it in a dryer at 60° C. for 4 hours.

The active electrolyte membrane 2 of Embodiment 8 was obtained under the same conditions as those used in Embodiment 7 except that the amount of 25% aqueous ammonia (additive) was changed to 200 cc.

The active electrolyte membrane 2 of Embodiment 9 was obtained under the same conditions as those used in Embodiment 7 except that 100 cc of ethanol was used as the additive.

The active electrolyte membrane 2 of Embodiment 10 was obtained under the same conditions as those used in Embodiment 7 except that 5% polyoxyethylene dodecyl ether (product name Briji 35) was used as the additive.

The active electrolyte membrane 2 of Embodiment 11 was obtained under the same conditions as those used in Embodiment 7 except that the aforementioned cationic Pt complex solution used contained Pt at 1.5 times the target amount of Pt that was to be supported (0.15 mg/cm$^2$).

The active electrolyte membrane 2 of Embodiment 12 was obtained under the same conditions as those used in Embodiment 7 except that the aforementioned cationic Pt complex solution used contained Pt at 6 times the target amount of Pt that was to be supported (0.15 mg/cm$^2$).

A Pt catalyst layer was formed by a sputtering method on the surface of an electrolyte membrane (brand name, Flemion) which was of the same type as that used in Embodiment 7. This active electrolyte membrane 2 was termed Comparative Embodiment 4.

An air electrode 3 and a fuel electrode 4 were prepared by a method involving the formation of an auxiliary catalyst layer 11 by coating a mixture of carbon black particles, on the surface of which Pt particles had been supported, and a fluorinated resin type ion exchanger (brand name Flemion), which is a polymer electrolyte, on one surface of a porous carbon sheet 10. In this case, the ratio by weight of carbon black particles to Pt particles was 1 to 1.

Table 4 shows the components of the auxiliary catalyst layers 11 of Examples 4 to 6. In the table, C denotes carbon black particles and PE denotes polymer electrolyte.

In Example 6, the layer comprised carbon black alone and was not an auxiliary catalyst layer 11, but it is listed for completeness, and PTFE (polytetrafluoroethylene) was used instead of a polymer electrolyte.

Table 5 shows the components of the active electrolyte membrane 2 and combinations with the auxiliary catalyst layer 11 in the fuel cells in Embodiments 7 to 13 and Comparative Embodiments 4 and 5.

The active electrolyte membrane 2 of Embodiment 13 was the same as that of Embodiment 7, the Pt catalyst in Comparative Embodiment 4 was in a layered form and the electrolyte membrane 7 of Comparative Embodiment 5 was a membrane alone which had not been subjected to the aforementioned ion exchange treatment.

Each of the fuel cells was operated so as to examine the relationship between the current density and the terminal voltage and the results are given in Table 6. In Table 6, Embodiments 7 to 13 and Comparative Embodiments 4 and 5 correspond to the fuel cells using the active electrolyte membranes 2, etc. of Embodiments 7 to 13 and Comparative Embodiments 4 and 5 in Table 5 respectively.

Figure 8:
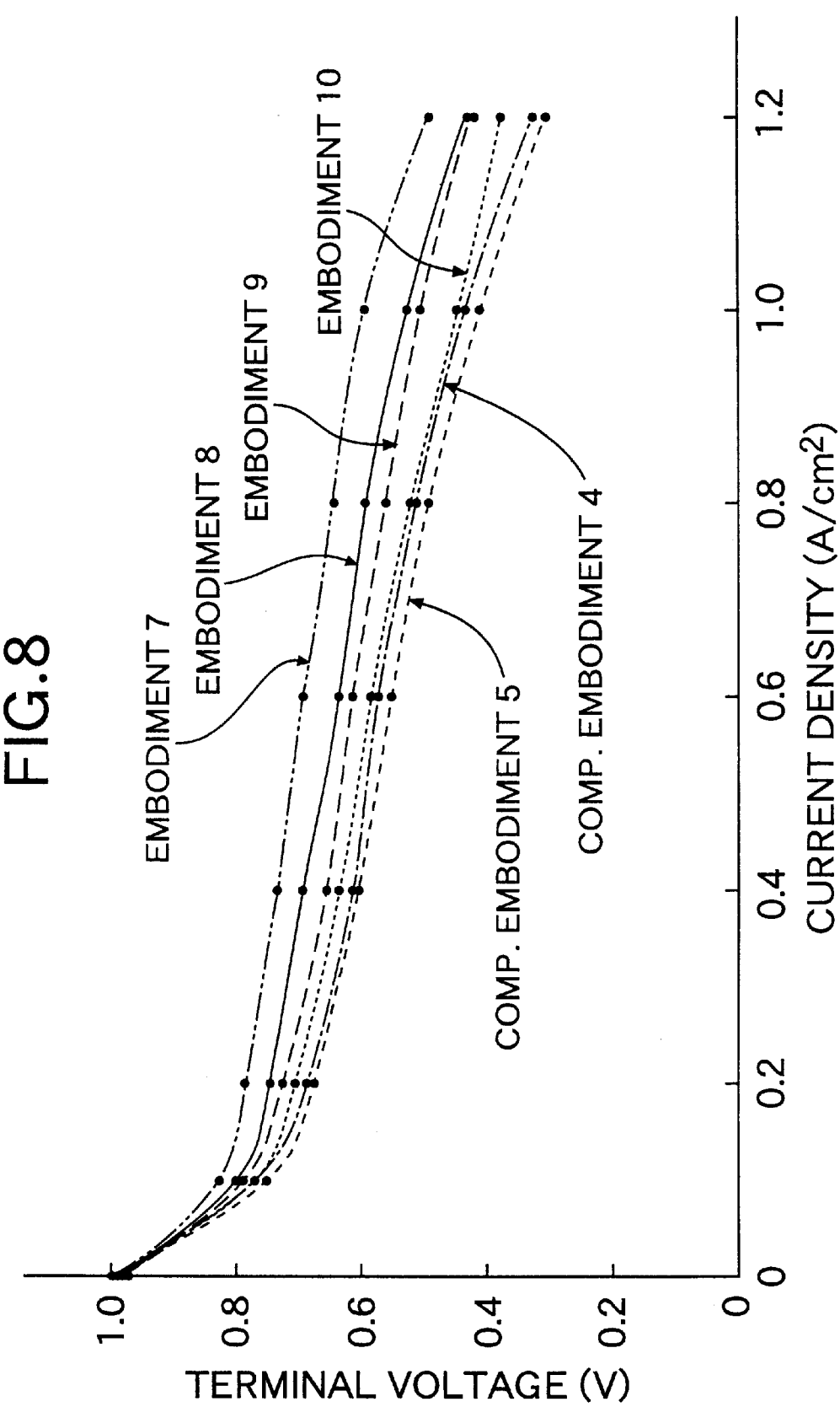
FIG. 8 is a graph showing the relationship between the terminal voltage and the current density in various types of solid polymer type fuel cell.
Figure 9:
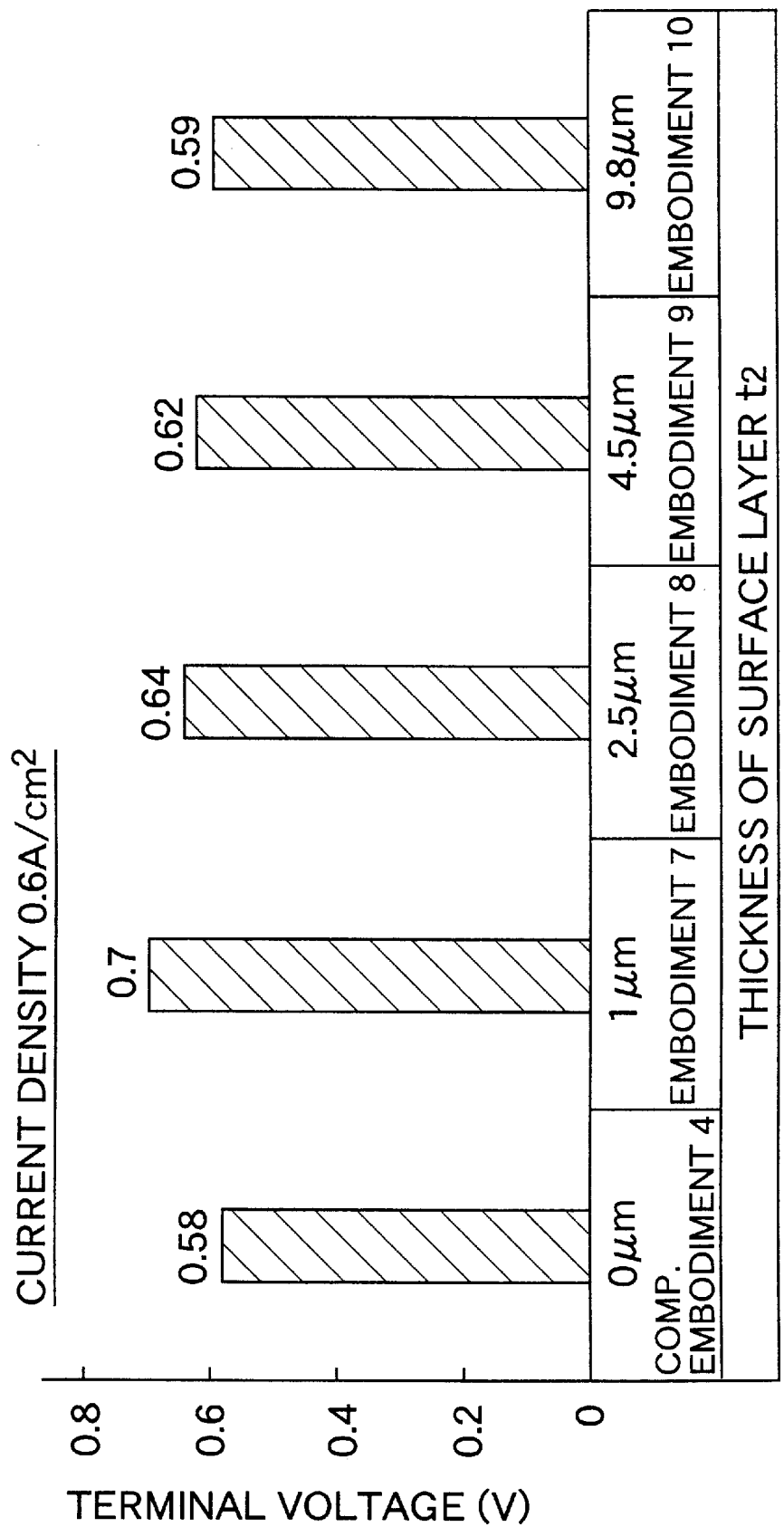
FIG. 9 is a graph showing the relationship between the thickness of the surface layer and the terminal voltage in various types of solid polymer type fuel cell.

FIG. 8 is a graph showing the relationship between the terminal voltage and the current density in the fuel cells using Embodiments 7 to 10 and Comparative Embodiments 4 and 5 in Table 6. FIG. 9 is a graph showing the relationship between the thickness $t_2$ of the surface layers 7b and the terminal voltage at a current density of 0.6 A/cm$^2$ in the fuel cells using Embodiments 7 to 10 and Comparative Embodiment 4 based on Tables 5 and 6. It can be seen from FIGS. 8 and 9 that the fuel cells using Embodiments 7 to 10 having surface layers 7b in which Pt particles 9 were distributed had a superior ability to generate power to those using Comparative Examples 4 and 5 not having the aforementioned surface layer. The ability to generate power of the fuel cells using Embodiments 11 and 12 was similar to that of the fuel cell using Embodiment 8, and the ability to generate power of the fuel cell using Embodiment 13 was similar to that of the fuel cell using Embodiment 10.

The thickness $t_2$ of the surface layer 7b increased according to the additive in the order: 100 cc of 25% aqueous ammonia (Embodiment 7), 200 cc of 25% aqueous ammonia (Embodiment 8), 100 cc of ethanol (Embodiment 9) and 5% polyoxyethylene dodecyl ether (Embodiment 10), but on the other hand the ability to generate power decreased. This is due to the ability of hydrogen gas to permeate to the Pt particles present inside the surface layer 7b.

Figure 10:
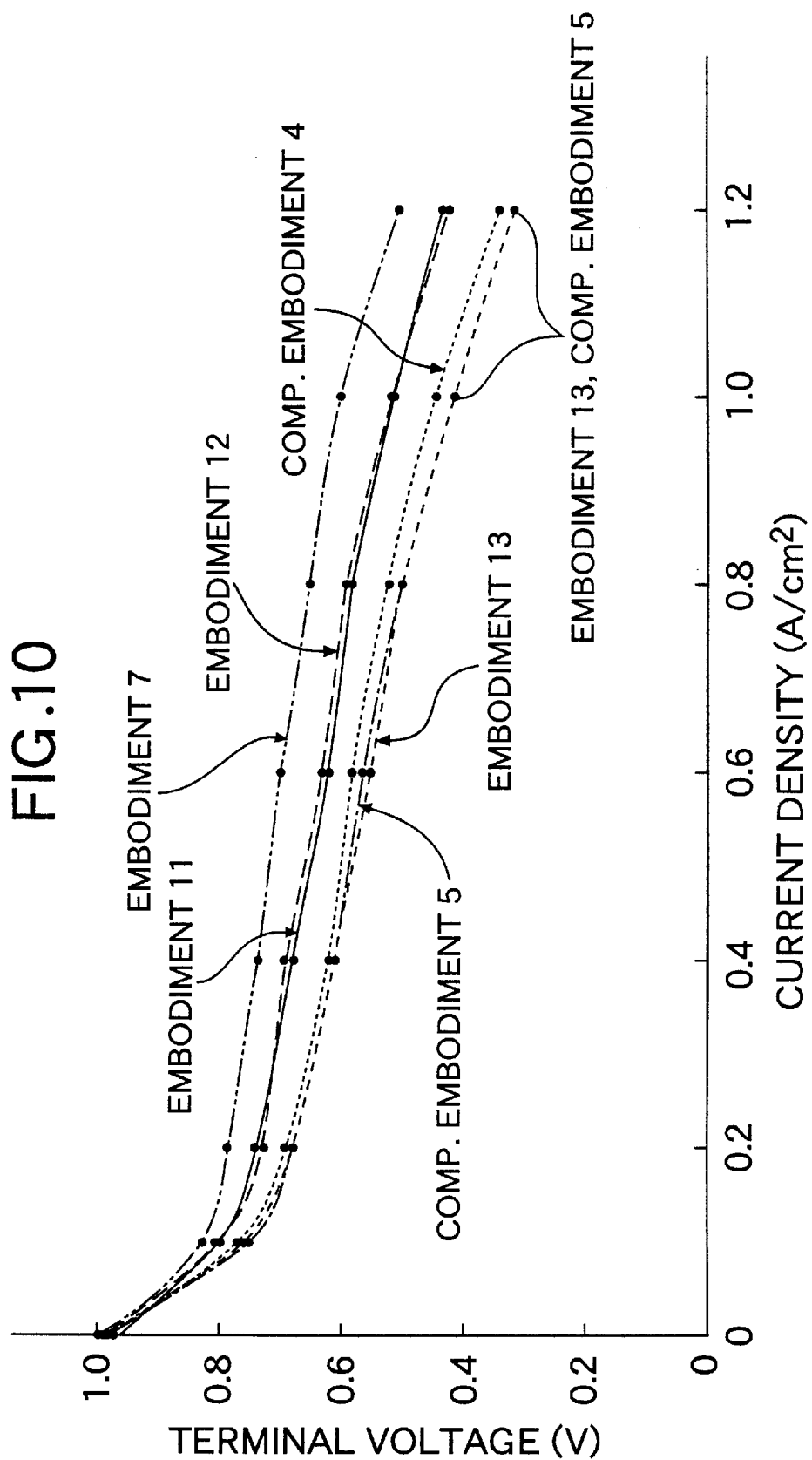
FIG. 10 is a graph showing the relationship between the current density and the terminal voltage in various types of solid polymer type fuel cell.

FIG. 10 is a graph showing the relationship between the current density and the terminal voltage in the fuel cells using Embodiments 7, 11 to 13 and Comparative Embodiments 4 and 5 in Table 6.

When comparing the fuel cell using Embodiment 13 which, although having an active electrolyte membrane 2 did not have an auxiliary catalyst layer 11, with the fuel cell using Comparative Embodiment 5 which, although having an auxiliary catalyst layer 11 did not have an active electrolyte membrane 2, although the amount of Pt particles supported in Comparative Embodiment 5 was about 3.1 times that in Embodiment 13, the ability to generate power of the two fuel cells was almost the same. This result suggests that the significance of distributing and supporting Pt particles 9 in the surface layers 7b of the electrolyte membrane 7 is clear.

What is claimed is:

1. An active solid polymer electrolyte membrane in a solid polymer fuel cell comprising a solid polymer electrolyte membrane and a plurality of precious metal catalyst particles supported on the surfaces of said solid polymer electrolyte membrane by ion exchange and distributed uniformly over the surfaces thereof, wherein an amount CA of said precious metal catalyst particles is in a range of $0.015 \text{ mg/cm}^2 \leq CA \leq 0.32 \text{ mg/cm}^2$.

2. The active solid polymer electrolyte membrane in a solid polymer fuel cell according to claim 1, wherein said precious metal catalyst particles are secondary particles having a columnar shape.

3. The active solid polymer electrolyte membrane in a solid polymer fuel cell according to claim 1 or 2, wherein the percentage coverage z of said surfaces of said solid polymer electrolyte membrane by said precious metal catalyst particles present on said surfaces is z <95%.

4. The active solid polymer electrolyte membrane in a solid polymer fuel cell according to any one of claims 1 or 2, wherein said surfaces of said solid polymer electrolyte membrane are surfaces facing auxiliary catalyst layers which are provided so as to be in close contact with said precious metal catalyst particles.

5. An active solid polymer electrolyte membrane in a solid polymer fuel cell comprising a solid polymer electrolyte membrane and a plurality of precious metal catalyst particles supported inside the surface layers of said polymer electrolyte membrane by ion exchange and distributed uniformly throughout the inside of the surface layers thereof, wherein an amount CA of said precious metal catalyst particles supported on the surfaces of said solid polymer electrolyte membrane is in a range of $0.14 \text{ mg/cm}^2 \leq CA \leq 0.35 \text{ mg/cm}^2$.

6. The active solid polymer electrolyte membrane in a solid polymer fuel cell according to claim 5, wherein the thickness $t_2$ of said surface layer is $\leq 10 \text{ }\mu m$.

7. A process for the production of an active solid polymer electrolyte membrane in a solid polymer fuel cell comprising a solid polymer electrolyte membrane and a plurality of precious metal catalyst particles supported on the surfaces of said solid polymer electrolyte membrane by ion exchange and distributed uniformly over the surfaces thereof, wherein said process comprises in sequence a step in which said solid polymer electrolyte membrane is immersed in a solution of a precious metal complex so as to carry out ion exchange, a step in which said solid polymer electrolyte membrane is washed with pure water, a step in which said solid polymer electrolyte membrane is subjected to a reduction treatment, a step in which said solid polymer electrolyte membrane is washed with pure water and a step in which said solid polymer electrolyte membrane is dried.

8. A process for the production of an active solid polymer electrolyte membrane in a solid polymer fuel cell comprising a solid polymer electrolyte membrane and a plurality of precious metal catalyst particles supported inside the surface layers of said solid polymer electrolyte membrane by ion exchange and distributed uniformly throughout the inside of the surface layers thereof, wherein said process comprises in sequence a step in which said solid polymer electrolyte membrane is immersed in a liquid mixture of a solution of a precious metal complex and at least one type of additive chosen from the group comprising water-soluble organic solvents, nonionic surfactants and nonmetallic bases so as to carry out ion exchange, a step in which said solid polymer electrolyte membrane is washed with pure water, a step in which said solid polymer electrolyte membrane is subjected to a reduction treatment, a step in which said solid polymer electrolyte membrane is washed with pure water and a step in which said solid polymer electrolyte membrane is dried.

9. The active solid polymer electrolyte membrane in a solid polymer fuel cell according to claim 8, wherein said precious metal catalyst particles are secondary particles having a columnar shape, a particle size $d_2$ of $d_2 \leq 300 \text{ nm}$ and a height h of $h \leq 200 \text{ nm}$.

10. The active solid polymer electrolyte membrane in a solid polymer fuel cell according to claim 8, wherein the percentage coverage z of said surfaces of said solid polymer electrolyte membrane by said precious metal catalyst particles present on said surfaces is z <95%.

11. The active solid polymer electrolyte membrane in a solid polymer fuel cell according to claim 9, wherein the percentage coverage z of said surfaces of said solid polymer electrolyte membrane by said precious metal catalyst particles present on said surfaces is z <95%.

12. The active solid polymer electrolyte membrane in a solid polymer fuel cell according to claim 5, wherein said surface layers are present within surfaces of said solid polymer electrolyte membrane and the thickness t2 of said surface layers is $t_2 \leq 10 \text{ nm}$.

13. A process for the production of an active solid polymer electrolyte membrane, comprising in sequence a step in which said solid polymer electrolyte membrane is immersed in a solution of a precious metal complex so as to carry out ion exchange, a step in which said solid polymer electrolyte membrane is washed, a step in which said solid polymer electrolyte membrane is subjected to a reduction treatment, a step in which said solid polymer electrolyte membrane is washed, and a step in which said solid polymer electrolyte membrane is dried, wherein said ion exchange is carried out using a liquid mixture of said precious metal complex solution and at least one type of additive chosen from the group comprising water-soluble organic solvents, nonionic surfactants and nonmetallic bases.

14. The process for the production of an active solid polymer electrolyte membrane according to claim 13, wherein in said additive, methanol, ethanol and ethylene glycol can be used as said water-soluble organic solvents; polyoxyethylene dodecyl ether and polyoxyethylene octylphenyl ether can be used as said nonionic surfactants; and ammonia can be used as said nonmetallic base.

* * * * *